United States Patent [19]

Baumgarten et al.

[11] Patent Number: 5,181,293
[45] Date of Patent: Jan. 26, 1993

[54] WIPER SYSTEM WITH EXTENDIBLE WIPER ARM

[76] Inventors: Peter Baumgarten, In der langen Gasse 13, 8630 Coburg; Bruno Egner-Walter, Käferflugstr. 43, 7100 Heilbronn; Eckhardt Schmid, Heilbronner Str. 62, 7129 Brackenheim; Wolfgang Scholl, Forststr. 29, 7121 Gemmrigheim, all of Fed. Rep. of Germany

[21] Appl. No.: 469,594

[22] PCT Filed: Jul. 15, 1989

[86] PCT No.: PCT/EP89/00823
§ 371 Date: Mar. 26, 1990
§ 102(e) Date: Mar. 26, 1990

[30] Foreign Application Priority Data

Jul. 26, 1988 [DE] Fed. Rep. of Germany ....... 3825321

[51] Int. Cl.⁵ ................................................ B60S 1/36
[52] U.S. Cl. ................................ 15/250.21; 15/250.23
[58] Field of Search ............ 15/250.21, 250.13, 250.39, 15/250.29, 250.30

[56] References Cited

U.S. PATENT DOCUMENTS 4,790,046 12/1988 Eustache ......................... 15/250.21

FOREIGN PATENT DOCUMENTS

| 902964 | 7/1985 | European Pat. Off. . |
| 0218192 | 4/1987 | European Pat. Off. ......... 15/250.13 |
| 0250294 | 12/1987 | European Pat. Off. ......... 15/250.13 |
| 3405677 | 8/1984 | Fed. Rep. of Germany . |
| 3426607 | 1/1986 | Fed. Rep. of Germany ... 15/250.13 |
| 3607704 | 9/1986 | Fed. Rep. of Germany . |
| 3616702 | 11/1987 | Fed. Rep. of Germany ... 15/250.13 |
| 2154435 | 9/1985 | United Kingdom ............. 15/250.21 |
| 8804624 | 6/1988 | World Int. Prop. O. ....... 15/250.13 |

Primary Examiner—Harvey C. Hornsby
Assistant Examiner—Gary K. Graham
Attorney, Agent, or Firm—Robert P. Seitter; J. Gordon Lewis

[57] ABSTRACT

A wiper system, which is used especially for motor vehicles and in which the pendulum-motion of at least one wiper blade is overlapped by a motion of the wiper blade in its longitudinal direction. The wiper blade can be moved by means of a gearing that can be driven via a stroking shaft coaxially running to the wiper shaft. The stroking shaft is connected to a coupler via a stroking swivelling lever, which coupler is linked to an intermediate lever that can swivellably be driven around a fixed axis by the drive motor. In order to be able to wipe a big part of the windshield of a motor vehicle, the coupler passes a dead center when the intermediate lever is swivelling from the one reversing position to the other, in which dead center the coupler reverses the direction of its motion.

7 Claims, 6 Drawing Sheets

WIPER SYSTEM WITH EXTENDIBLE WIPER ARM

TECHNICAL FIELD

The present invention relates to a wiper system which is to be used especially for motor vehicles.

BACKGROUND ART

From practice as well as from a certain number of specifications, wiper systems for motor vehicles are known, in which during the operation of the pendulum-motion of the wiper arm and thus of the wiper blade carried by the wiper arm a motion of the wiper blade is overlapped essentially in its longitudinal direction. This shift of the wiper blade is achieved by changing the effective length of the wiper arm. For this purpose the wiper arm can telescopically be constructed and can comprise a piston which by means of a gear is shifted with respect to a guide housing that moves only in pendulum-motion. Such a construction is known, for instance from the DE-PS 34 05 131, the EP-OS 0 218 192 or the EP-OS 0 250 294. As to another construction, as it is shown in the DE-OS 34 05 677, more or less only the link between the wiper blade and the wiper arm can be moved with respect to the wiper arm.

As to the wiper systems described in the specifications mentioned above, the motion for changing the effective length of the wiper arm via a coupler is derived form a rotary motion of a crank which is non-rotatably seated on a stroking shaft coaxially running with respect to the wiper shaft.

From the DE-PS 34 05 131 and the EP-OS 0218 192, it is known to drive the stroking shaft continuously in the same direction of rotation during the operation of the wiper shaft. Therefore, in one half of a wiping cycle it rotates in the same direction and in the other half of a wiping cycle it rotates in the opposite direction to the wiper shaft. The consequence thereof is that the wiping areas of the wiper blade when being moved forward and backwards are different.

As to the wiper system of the DE-OS 34 05 677, the stroking shaft is driven via a stroking swivelling lever in the opposite direction each to the wiper shaft. For this purpose the stroking swivelling lever is connected to an intermediate lever via a coupler, which intermediate lever has an axis of rotation fixed to the motor vehicle. A device rod is linked both to the intermediate lever and to a wiper shaft swivelling lever fastened to the wiper shaft, which wiper shaft swivelling lever is driven by an electric motor via a crank drive. Due to the confrontation of the wiper shaft and of the stroking shaft, already small swivelling angles to the stroking crank seated on the stroking shaft lead to a big change of the angle between the stroking crank and the wiper arm and thus to a big change of length of the wiper arm.

It is known from the EP-OS O 250 294 to change the direction of rotation of the striking shaft within half a wiping cycle. Thus, the stroking shaft rotates both in the same and in the opposite direction to the wiper shaft within half a wiping cycle. The stroking shaft is driven via a stroking swivelling lever being part of a crank drive, the other crank of which is connected with the stroking swivelling lever and is formed by a pinion meshing with a stationary toothed ring. Such a construction is very expensive because of the pinion and of the toothed ring, for the pinion and the toothed ring are to mesh with each other with very little play in order to work quietly.

SUMMARY OF THE INVENTION

The object to the invention present is to develop a wiper system that can be adapted to different sizes of window panes at low coasts.

This object is achieved according to the invention by a wiper system in which, when the intermediate lever is swiveled from the one reversing position to the other, the coupler passes a dead center in which the direction of its longitudinal movement is reversed. Thus, the direction of rotation of the stroking shaft is not only reversed in the end positions of the wiper arm, but also between the end positions of the wiper arm so that the stroking shaft during half a wiping cycle partly rotates in the same and partly rotates in the opposite direction to the wiper shaft. For this purpose, no expensive pinion nor expensive toothed ring are needed. In a wiper system according to the invention, different rotary angles of the stroking shaft in the same and in the opposite direction of rotation to the wiper shaft can easily be achieved by changing the dead center of the coupler.

It is of a special advantage when the wiper blade is moved out of a parking position, the wiper shaft and the stroking shaft rotate in the same direction at first. Therefore, the stroking shaft and the wiper shaft can be arranged above a member of the wiper arm which can tangentially be extended to the two shafts, so that the gear which can be driven by the stroking shaft as well as perhaps a housing receiving this gear, at least in the parking position of the wiper arm, may be situated to a large extend underneath the lower edge of the pane to be wiped.

According to an aspect of the present invention the dead center of the coupler can be achieved in an advantageous way be linking the coupler to the intermediate lever at such a point that, when the intermediate lever is swivelling, the lever arm from the axis of the intermediate lever up to the linking point is made congruent with the longitudinal direction of the coupler.

Furthermore, it is of a special advantage when the effective lever arm between the axis of the intermediate lever and of a drive rod driving the intermediate lever is smaller tan the effective lever arm between the axis of the intermediate lever and the coupler. Thus, an especially long way of the coupler is achieved.

It may be useful to connect the coupler and the drive rod with the intermediate leer at a certain distance of each other in the direction of the axis of the intermediate lever. Therefore, the articulated axles at the ends of the two rods can be arranged to a large extent in parallel direction to each other. Also a certain distance between the coupler and the drive rod may be useful under the space conditions next to the intermediate lever.

According to another aspect of the present invention the intermediate lever is advantageously arranged on the same side of the wiper shaft as the drive motor. If there is another wiper shaft for driving another wiper arm, if driven by a stroking shaft or not, the intermediate lever is preferably arranged between the two wiper shaft. It is effective to use a support frame in which the wiper motor and/or several bearings for wiper shafts are fixed, also for fastening the intermediate lever. Apart from the wiper arms and wiper blades, the wiper system can then be mounted into the motor vehicle as a unit.

It is of an advantage that the intermediate lever can be driven via a drive rod by a wiper shaft swivelling lever non-rotatably connected wit the wiper shaft carrying the wiper arm with the wiper blade movable in its longitudinal direction. Thus, it is easily achieved that the reversing points of the wiper shaft swivelling lever and of the intermediate lever are temporally identical and that the wiping areas are the same when the wiper blade is moved forward and backwards.

An advantageous arrangement is obtained if a push rod, which can be moved by the drive motor and is linked to the wiper shaft swivelling lever, and a drive rod are stituated on opposite sides of the wiper shaft. It is also favorable, if the coupler and the drive rod, looked at in the direction of the wiper shaft, are axially displaced to each other on opposite sides of the wiper shaft swivelling lever.

The intermediate lever can also directly be driven by a crank of the drive motor via a drive rod.

The arrangement of the different elongated rods is simplified, if the intermediate lever and wiper shaft swivelling lever can be driven in the same direction.

Several embodiments of a wiper system according to the invention are illustrated in the drawings. By means of the figures of these drawings the invention is described in detail in the following:

BRIEF DESCRIPTION O THE DRAWINGS

FIG. 1 is a view of a windshield of a motor vehicle with the parts of a wiper system according to the invention visible from outside, FIG. 2 illustrates the covered parts of a wiper system according to FIG. 1 for driving a reciprocating stroking wiper arm and a conventional wiper arm, the length of which is invariable, FIG. 3 is a view of a wiper system according to FIG. 2 in the direction of Arrow F, whereby for clearness's sake unimportant parts are left out, FIG. 4 an enlarged view of the crank gearing driven by the stroking shaft for changing the length of the wiper arm, FIG. 5 is the schematic diagram of a second embodiment, which, however, is constructed without any cross linkages and FIG. 6 is the schematic diagram of a third embodiment in which the intermediate lever is directly connected with the motor crank via a drive rod.

DETAILED DESCRIPTION OF THE INVENTION

Figure 1:
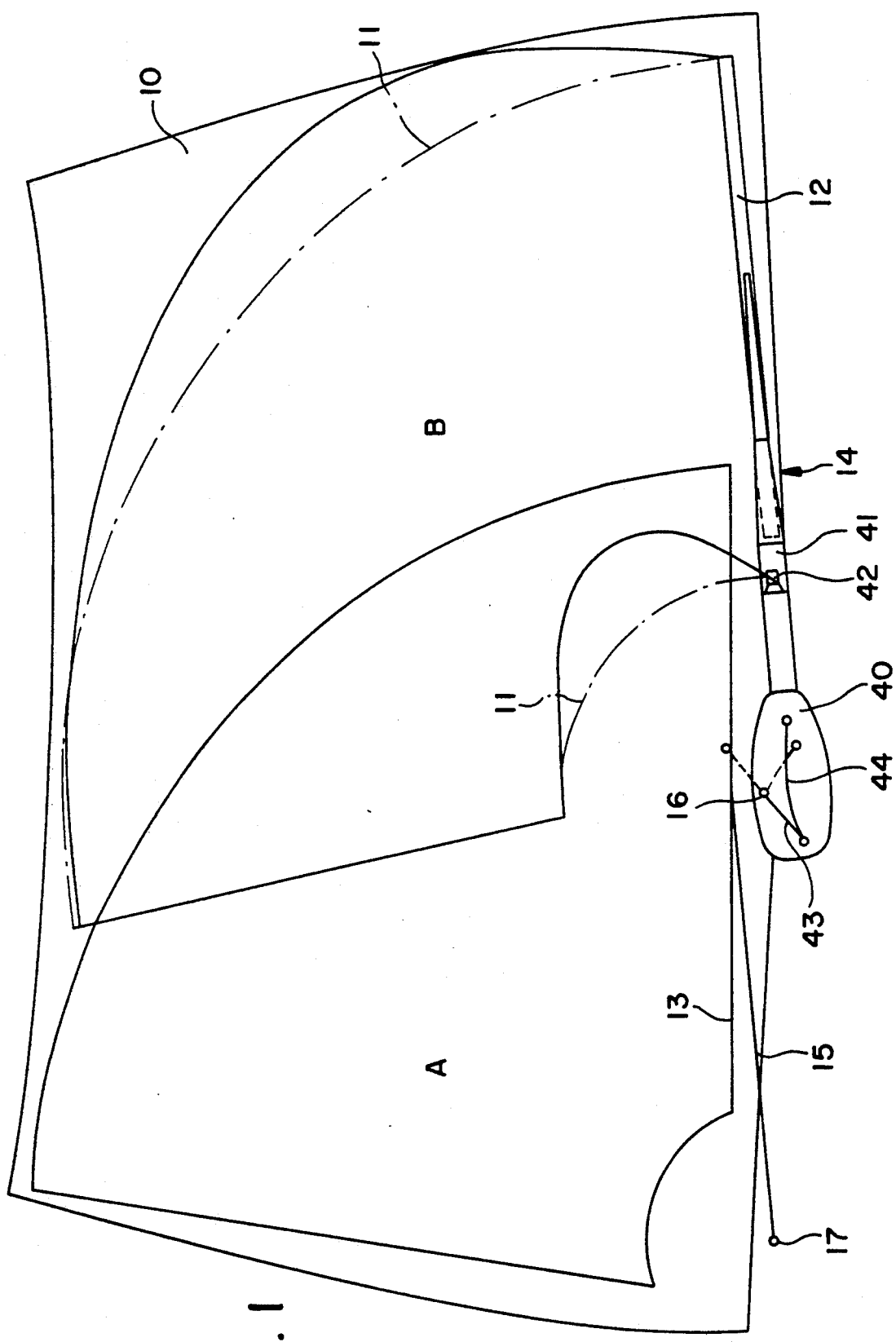
Figure 2:
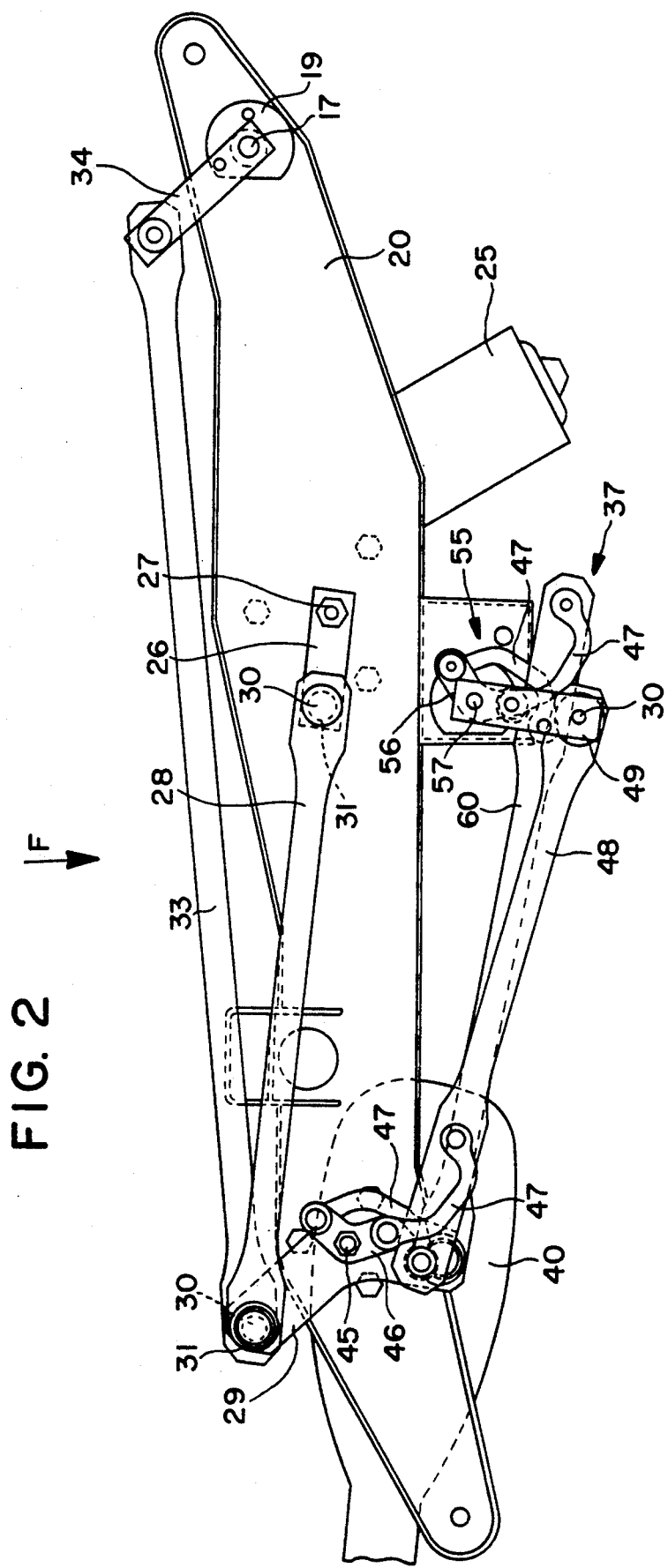
Figure 3:
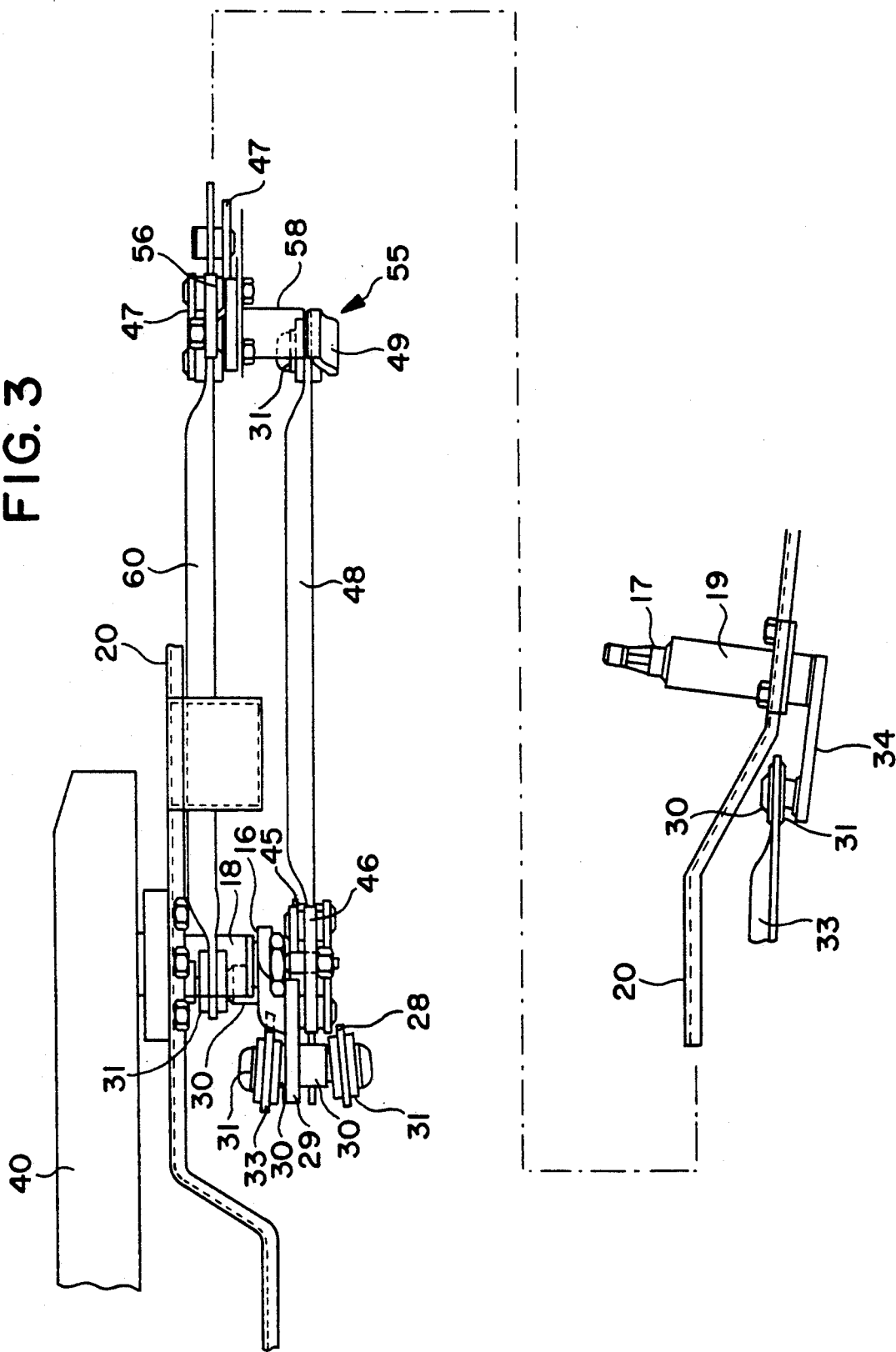

In FIG. 1, the windshield of a motor vehicle is designated by reference numeral 10 on which windshield the wiping areas A and B of two wiper blades 12 ad 13 are indicated. The wiping area A is wiped by the wiping blade 13 which, as it is usually known, is only driven in pendulum-motion between two reversing positions. The wiping area B, however, is wiped by the wiper blade 12, which during the pendulum-motion is moved also in its longitudinal direction. In the wiping area B, the size of a wiping area of a wiper blade driven only in pendulum-motion is indicated by dotted lines so that is can be seen that a bigger wiping area can be obtained by means of the wiper blade that can be moved to and fro. Thereby, the enlarged wiping area B on the driver's side shall be produced. Both wiper blades 12 and 13 are linked to a wiper arm 14 and 15, respectively. The longitudinal motion of the wiper blade 12 is achieved by changing the effective length of the wiper arm 134. The wiper arm 15 has a fixed length. The wiper arm 14 is non-rotatably fixed onto a wiper shaft 16 and the wiper 15 is non-rotatably fixed onto a wiper shaft 17. As shown in FIGS. 2 and 3, both wiper shafts 16 and 167 are rotatably located in wiper bearings 18 and 19 fastened to a support frame 20 which is fixed to the motor vehicle. Thus, the wiper shafts 16 and 17 have axes fixed to the motor vehicle.

An electric motor 25 which comprises a worm-gear pair with a worm wheel as a driven wheel which is not illustrated any further, but is generally known, and which is screwed to the support frame 20 between the two wiper bearings 18 and 19 drives the two wiper shafts 16 and 17 via a coupler gearing. The coupler gearing comprises, first of all, the rotating motor crank 26 which is non-rotatably fixed onto the driven shaft 27. The one end of a first push rod 28 is linked to the motor crank 26 via a ball pin 30 seated on the motor crank 26 and a ball joint 31 injection-molded onto the push rod 28 and the other end of said push rod 28 is linked to a swivelling lever 29 fixedly connected with the wiper shaft 16. The joint between the swivelling lever 29 and the push rod 28 is also formed by a ball pi 30 on the swivelling lever and a ball joint on the push rod. The ball pin 30 passes through the swivelling lever 29 and comprises a ball on both sides of the swivelling lever. By means of a second ball and of a ball joint 31, the one end of a second push rod 33 is linked to the swivelling lever 29. The other end of the push rod 33 is also connected with a swivelling lever 34 via a ball pin 30 and a ball joint 31, which swivelling lever is seated on the wiper shaft 17 and protected against twisting with respect to the wiper shaft 17.

During operation, the swivelling lever 29 is put into a to-and-fro, i.e. into a pendulum-motion via the rotating motor crank 26 and the push rod 28. This pendulum-motion is also transferred onto the swivelling lever 34 via the push rod 33. Thereby the swivelling levers and the push rods are arranged in such a way that the two swivelling leers 290 and 34 move in phase. Thus the wiper arms 14 and 15 are both swiveled either clockwise or anti-clockwise.

Figure 4:
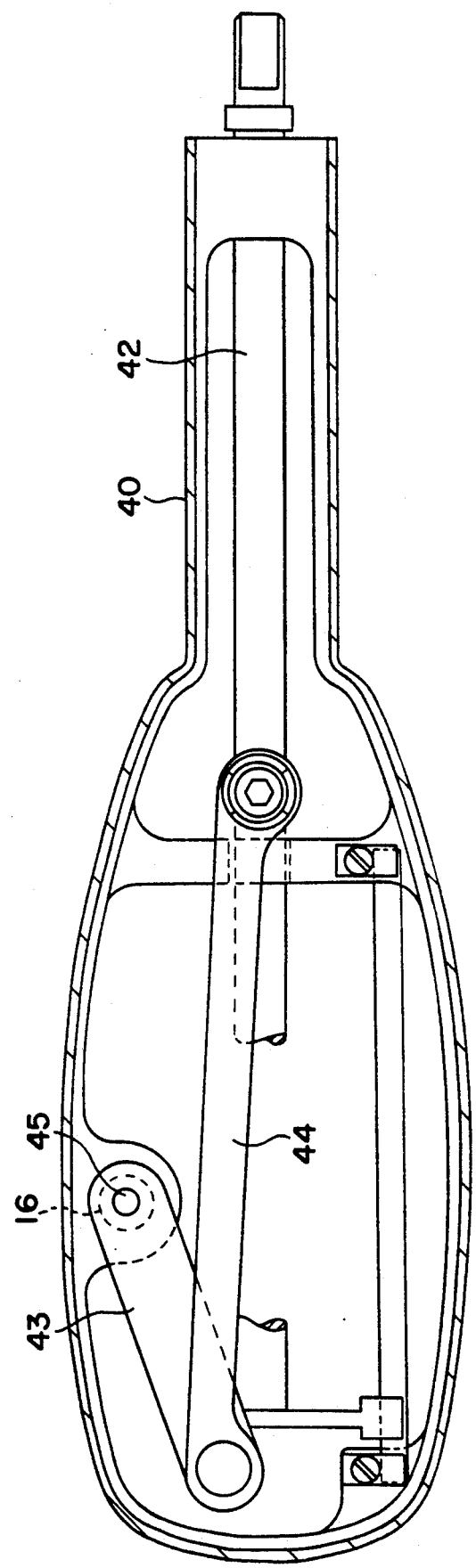

By means of the gearing members described up to now, only pendulum-motions of the wiper arms 14 and 15 can be produced. In order to be able to change the length of the wiper arm 14 as shown in FIGS 1 and 4, said wiper arm 14 consists more or less of a first section 490 in the form of a guide housing carrying out only a pendulum-motion during operation and a second section 41 which, together with a piston 42, is located in the guide housing 40 and can be shifted in longitudinal direction, and to which the pendulum-motion is transferred from the guide housing 40. The stroking motion of the piston 42 is achieved by a swivelling stroking crank 43 connected to the piston 42 via a connecting rod 44 and the axis of which stroking crank 43 is identical with the axis of the wiper shaft 16. Crank 43 and connecting rod 44 are also in the guide housing 40. As it is made clear in the FIGS. 1 and 4, the axis of the wiper shaft 16 nd thus that the of the strike crank 43 is located beside the axis of the piston 42. Thus, this piston 42 is not radially, but tangentially moved to the axis of the wiper shaft 16. The arrangement is chosen in such a way that the piston 42 is underneath the wiper shaft 16 in the parking position of the wiper arm 14 illustrated in RIG. 1. Therefore the housing 40 asymmetrically located to the wiper shaft 16 does not reduce the view through the windshield 10 in the parking position.

The stroking crank 43 fastened to a stroking shaft 45 leading through the hollow wiper shaft 16 and, looked at from the guide housing 40, projects the wiper shaft 16 beyond the bearing 18. At the projecting end of stroking swivelling lever 46 is fixed onto the stroking shaft 45, onto which stroking swivelling lever 46 the one end of a coupler 48 is linked via two cross linkages 47. At the other end the coupler 48 is articulated to a lever 49 via a ball pin 30 and a ball joint 31.

This lever 49 is part of an intermediate lever 55 furthermore comprising a swivelling lever 56 and a shaft 57 which can be rotated in a bearing 58 and onto which at an axial distance on the one side of the bearing the lever 49 and on the other side of the bearing the swivelling lever 56 are fastened. By means of the axial displacement it is achieved that the plane of motion of the lever 49 and the cross linkages 47 between coupler 48 and the stroking swivelling lever 46 are identical to a large extent. The bearing 58 is fixed onto the support frame 20 between the two wiper shafts 16 and 17 next to the motor 25.

The intermediate lever 55 can be moved via a drive rod 60, the one end of which is articulated to the swivelling lever 56 of the intermediate lever via two cross linkages 47 and the other end of which is articulated to the wiper shaft swivelling lever 29 via a ball pin 30 and a ball joint 31. Thereby the linking point of the drive rod 60 at the swivelling lever 29 is with respect to the wiper shaft 16 opposite the linking point of the push rod 28 on the swivelling lever 29. This means that the motions in longitudinal direction of the push rod 28 and of the drive rod 60 are contrary to each other. Besides, the linking points between the push rod 28 and the swivelling lever 29 as well as between the drive rod 60 nd the swivelling lever 29 are on different sides of the swivelling lever 29 and are axially displaced to each other. Thus, it is achieved that the drive rod 60 is moved to a large extent only in one plane.

During operation, the drive rod 60 is moved to and fro via the motor crank 26, the push rod 28 ad the swivelling lever 29. This motion is changed into a swivelling movement of the intermediate lever 55 via the cross linkages 47. Thereby, the arrangement is chosen in such a way that the intermediate lever 55 rotates in the same direction as the swivelling lever 29. During half a wiping cycle, i.e. during a motion of the swivelling lever 29 from the one reversing position to the other, the intermediate lever 55 is swiveled around approximately 140 degrees. The lever 49 being part of the intermediate lever 55 is also swiveled around this angle. Swiveling the lever 49 is changed into a motion of the stroking swivelling lever 46 via the coupler 48 and the cross linkages 47. The effective length of the leer between the drive rod 60 and the intermediate lever 55 is smaller than the effective length of the lever between the coupler 48 and the intermediate lever 55 so that there is an increasing ratio of tho ways of the coupler 48 and of the drive rod 60 in longitudinal direction. It is of importance that, upon swivelling of the intermediate lever 55 form the one end position to the other, the direction of the lever 49 and the longitudinal direction of the coupler 48 are made congruent. In the embodiment described especially, the lever 49 and the coupler 48 are then in a stretched position to each other. When passing the dead center, the coupler 48 reverses the direction of its motion in longitudinal direction so that the direction of rotation of the stroking swivelling lever 46, too, is reversed without changing the directions of rotation of the intermediate lever 55. The reversal of the direction the stroking swivelling lever 46 leads to a reversal of the direction of the stroking shaft 45, the stroking crank 43, the connecting rod 44 and of the piston 42.

In the FIGS. 1 to 3, different parts of the wiper system are shown in positions occupied by them in the parking position of the wiper arms and wiper blades. When driving the swivelling lever 29 out of the parking position, that is clockwise in the view according to FIG. 2, the itermediate lever 55 is also swiveled clockwise. The lever 49, took of the intermediate lever 55 is swiveled clockwise. Thus the coupler 48, in the view according to FIG. 2, is first moved to the left and thus the stroking swivelling lever 46 is also swiveled clockwise. When leaving the parking position the wiper shaft 16 and the stroking shaft 45 move in the same direction at first. After a swivelling angle of approximately 90 degrees, the coupler 48 passes the dead center and reverses the direction of its longitudinal motion. Up to the reversing position of the swievelling lever 29 and of the itermediate lever 55, the stroking swivelling lever 46 and the stroking shaft 45 then rotate anti-clockwise. When returning from the reversing position to the parking position, the stroking swivelling lever 46 and the stroking shaft 45 rotate clockwise until the dead center of the coupler 48 is reached. Afterwards they rotate anti-clockwise.

By varying the initial position of the lever 49, the size of the angles can easily be changed, which angles are passed by the stroking swivelling lever 46 and the stroking shaft 45 in the same and in the opposite direction to the swivelling lever 29. In the embodiment shown in the FIGS. 1 to 4, the choice has been made an the lengths of the levers and of the rods are adapted to each other in such a way that the angle around which the stroking shaft 45 rotates in opposite direction to the wiper shaft 16 is about 70 degrees and the angle around which the stroking shaft 45 rotates in the same direction as the wiper shaft 16, is about 170–180 degrees.

In the FIGS. 1 to 4, the position of the stroking crank 43 in the guide housing 40 corresponding to the parking position is drawn in continuous lines. When leaving the parking position, the stroking crank 43 in correspondence with the views according to the FIGS. 1 and 4 which are contrary to the view according to FIG. 2, first rotates around approximately 180 degrees anti-clockwise and thereby the piston 42 is moved out of the guide housing 40 more and more. Then the coupler 48 passes its dead center and the direction of rotation of the stroking crank 43 is reversed. After that the stroking crank 43 passes an angle of approximately 70 degrees clockwise and thereby pulls the piston 42 totally back into the guide housing 40.

Figure 5:
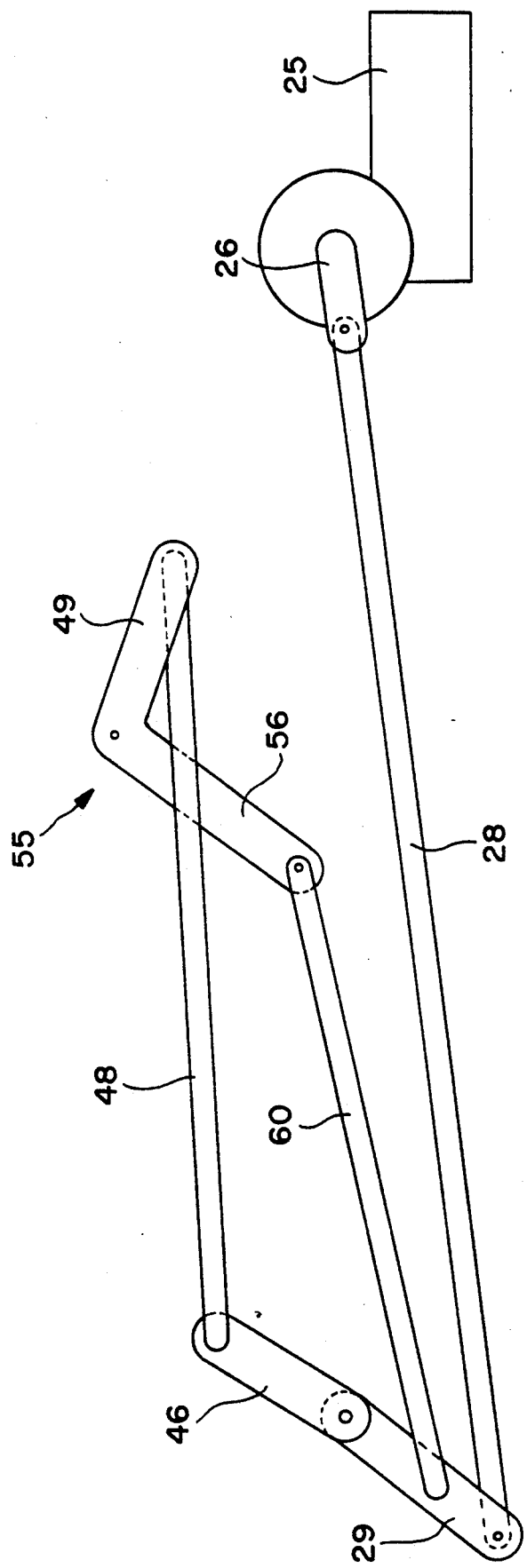

As to the embodiment according to FIG. 5, which is only illustrated in a schematic diagram, a wiper shaft swivelling lever 29 is driven in pendulum-motion by an electric motor 25 via a motor crank 26 and a push rod 28. The motion of the swivelling lever 29 is transferred to the intermediate lever 55 via a drive rod 60. The drive rod 60 is directly linked onto the swivelling lever 56 of the lever 55 without any cross linkages. The linking point of the drive rod 60 on the swivelling lever 29 and the axis of the swivelling lever 29 and the linking point of the push rod 28 on the swivelling lever 29 lie on one line. The coupler 48 is directly linked onto the lever 49 of the intermediate lever 55 and onto the stroking swivelling lever 46 reach. The two levers 56 and 49 to the intermediate lever 55 are arranged in an angle in such a way that the coupler 48 passes a dead center during the motion of the swivelling lever 56. In this dead center, the leer 49 and the coupler 48 are made congruent. Contrary to the embodiment according to the FIGS. 1 and 4, however, lever 459 and coupler 48 are no stretched in the dead center, but are directed against each other about 180 degrees.

The positions of the gearing members shown in FIG. 5 are to correspond to the parking position of the wiper arms and wiper blades. When switching on the electric motor 25, the swivelling lever 29 and the intermediate lever 55 are swiveled anti-clockwise. The lever 49 occupies such a position that the coupler 48 is first moved to the right so that it swivels the stroking swivelling lever 56 clockwise, that is contrary to the direction of the swivelling lever 29. Having passed the dead center, the coupler 48 swivels the stroking lever 46 anti-clockwise.

Figure 6:
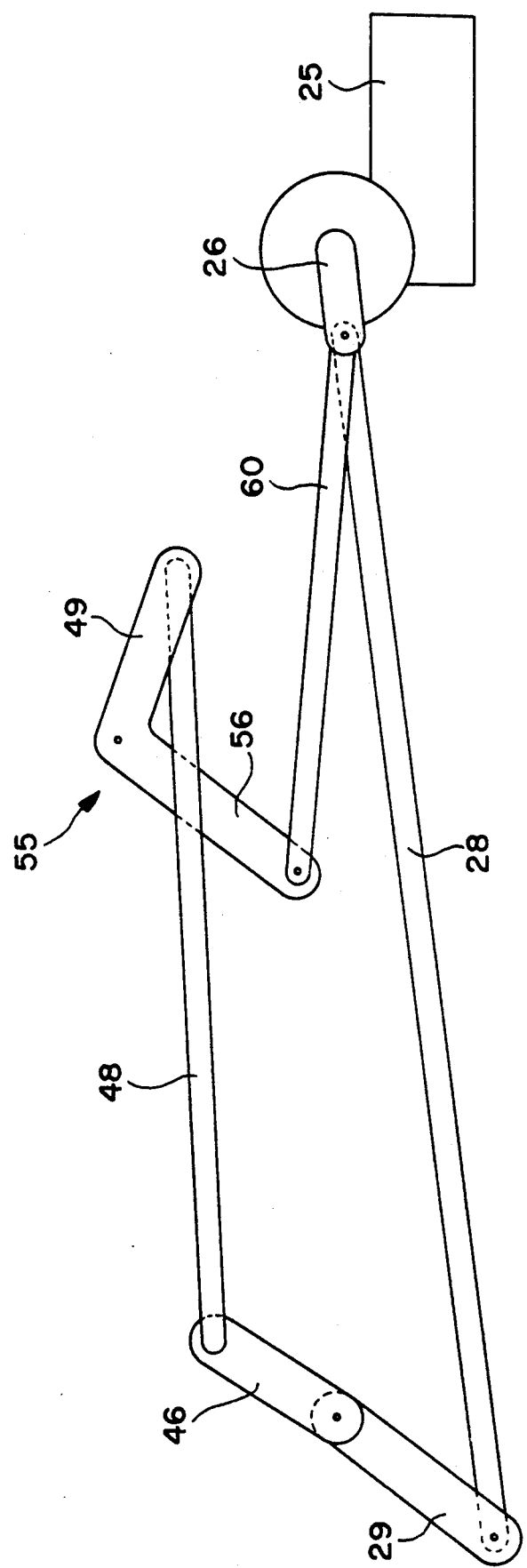

The embodiment according to FIG. 6 only differs from that according to FIG. 5 in the fact that the intermediate lever 55 is directly driven by the motor crank 26 of the electric motor 25 via a drive rod 60. Thereby, a shift of the phases between the swivelling motions of the swivelling lever 29 and of the intermediate lever 55 may occur, as it is shown in FIG. 6, for it can be seen that the push rod 28 and the motor crank 26 in the illustrated parking position of the wiper arms and wiper blades occupy a stretched position, whereas the drive rod 60 and the motor crank 26 enclose an angle not equal 180 degrees. This problem may be soled by separating the linking point of the drive rod 760 on the motor crank 26 from the linking point of the push rod 28 so that the stretched positions are passed simultaneously. Another solution would be to arrange the intermediate lever 55 with respect to the motor 25 and the swivelling lever 29 in such a way that the drive rod 60 and push rod 28 lie above each other in the stretched positions.

What is claimed is:

1. A windshield wiper system comprising:
   a wiper arm shaft;
   a drive means coupled to said wiper arm shaft for imparting reciprocating movement to said wiper arm shaft between first and second reversing positions;
   a wiper arm having a first section by which said wiper arm is mounted on said wiper arm shaft for pendulum-motion of said wiper arm as said wiper arm shaft undergoes reciprocating movement and a second section movable relative to said first section of said wiper arm along the longitudinal axis of said wiper arm;
   a wiper blade attached to said second section of said wiper arm;
   and mounting means for attaching said second section of said wiper arm to said first section of said wiper arm for pendulum-motion of said wiper blade with said wiper arm and movement of said wiper blade with said second section of said wiper arm along the longitudinal axis of said wiper arm during pendulum-motion of said wiper arm, said mounting means including:
   (a) a stroking shaft coaxial with said wiper arm shaft and which moves in the same direction as movement of said wiper arm shaft from said first reversing position to said second reversing position and moves in the opposite direction as movement of said wiper arm shaft from said second reversing position to said first reversing position,
   (b) means connected between said second section of said wiper arm and said stroking shaft for imparting movement to said second section of said wiper arm along the longitudinal axis of said wiper arm in response to movement of said stroking shaft,
   (c) a stroking swivelling lever attached to said stroking shaft for pivotal movement of said stroking shaft with said stroking swivelling lever,
   (d) a coupler connected at a first end to said stroking swivelling lever,
   (e) an intermediate lever mounted for swivellable movement between first and second reversing positions and having a first end attached to a second end of said coupler and a second end coupled to said drive means,
   said coupler passing through a dead center position while said immediate lever moves between said first and said second reversing positions of said intermediate lever at which dead center position longitudinal movement of said second section of said wiper arm is reversed.

2. A windshield wiper system according to claim 1 wherein movement of said stroking shaft while said wiper arm shaft moves from said first reversing position to said second reversing position is over a first rotational angle which is greater than a second rotational angle of movement of said stroking shaft while said wiper arm shaft moves from said second reversing position to said first reversing position.

3. A windshield wiper system according to claim 2 wherein said first rotational angle is approximately 170 degrees to 180 degrees and said second rotational angle is approximately 70 degrees.

4. A windshield wiper system comprising:
   a wiper arm shaft;
   drive means coupled to said wiper arm shaft for imparting reciprocating movement to said wiper arm shaft between first and second reversing positions;
   a wiper arm having a first section by which said wiper arm is mounted on aid wiper arm shaft for pendulum-motion of said wiper arm as said wiper arm shaft undergoes reciprocating movement and a second section movable relative to said first section of said wiper arm along the longitudinal axis of said wiper arm;
   a wiper blade attached to said second section of said wiper arm;
   and mounting means for attaching said second section of said wiper arm to said first section of said wiper arm for pendulum-motion of said wiper blade with said wiper arm and movement of said wiper blade with said second section of said wiper arm along the longitudinal axis of said wiper arm during pendulum-motion of said wiper arm, said mounting means including:
   (a) a stroking shaft coaxial with said wiper arm shaft and which moves in the same direction as said wiper arm shaft while said second section of said wiper arm moves longitudinally outward from said first section of said wiper arm,
   (b) means connected between said second section of said wiper arm and said stroking shaft for imparting movement to said second section of said wiper arm along the longitudinal axis of said wiper arm in response to movement of said stroking shaft, (c) a stroking swivelling leer attached to said stroking shaft for pivotal movement of said stroking shaft with said stroking swivelling lever, (d) a coupler connected at a first end to said stroking swivelling lever, (e) an inebriate lever mounted for swivellable movement between first and second reversing positions and having a first end attached to a second end of said coupler and a second end coupled to said drive means, said coupler passing through a dead center position while said intermediate lever moves between said first and said second reversing positions of said intermediate lever at which dead center position longitudinal movement of said second section of said wiper arm is reversed.

5. A windshield wiper system comprising:

a wiper arm shaft;

a wiper arm having a first section by which said wiper arm is mounted on aid wiper arm shaft for pendulum-motion of said wiper arm as said wiper arm shaft undergoes reciprocating movement and a second section movable relative to said first section of said wiper arm along the longitudinal axis of said wiper arm;

a wiper blade attached to said second section of said wiper arm;

mounting means or attaching said second section of sad wiper arm to said first section of said wiper arm for pendulum-motion of said wiper blade with said wiper arm and movement of said wiper blade with said second section of said wiper arm along the longitudinal axis of said wiper arm during pendulum-motion of said wiper arm, said mounting means including:

(a) a stroking shaft coaxial with said wiper arm shaft, (b) means connected between said second section of said wipe r arm and said stroking shaft for imparting movement to said second section of said wiper arm along the longitudinal axis of said wiper arm in response to movement of said stroking shaft, (c) a stroking swivelling leer attached to said stroking shaft for pivotal movement of said stroking shaft with said stroking swivelling lever, (d) a coupler connected at a first end to said stroking swivelling lever, (e) an intermediate lever mounted for swivellable movement between first and second reversing positions and having a first end attached to a second end of said coupler and a portion between its swivel point and said first end of said intermediate lever which is congruent with the longitudinal axis of said coupler, and drive means coupled to a second end of said intermediate lever and to said wiper arm shaft for imparting reciprocating movement to said wiper arm shaft between first and second reversing positions and including;

(a) a wiper arm shaft swivelling lever fixed to and pivotal with said wiper arm shaft, and (b) a drive rod connected between said intermediate lever and said wiper arm shaft swivelling lever and spaced from said coupler along the axis of said wiper arm shaft on an opposite side of said wiper arm shaft swivelling lever form said coupler, said coupler passing through a dead center position while said intermediate lever moves between said first and said second reversing positions of said intermediate leer at which dead center position longitudinal movement of said second section of said wiper arm is reversed.

6. A windshield wiper system comprising:

a wiper arm shaft;

a wiper arm having a first section by which said wiper arm is mounted on said wiper arm shaft for pendulum-motion of said wiper arm as said wiper arm shaft undergoes reciprocating movement and a second section movable relative to said first section of said wiper arm along the longitudinal axis of said wiper arm;

a wiper blade attached to said second section of aid wiper arm;

mounting means or attaching said second section of said wiper arm to said first section of said wiper arm for pendulum-motion of said wiper blade with said wiper arm and movement of said wiper blade with said second section of said wiper arm along the longitudinal axis of said wiper arm during pendulum-motion of said wiper arm, said mounting means including:

(a) a stroking shaft coaxial with said wiper arm shaft, (b) means connected between said second section of said wiper arm and said stroking shaft for imparting movement to said second section of said wiper arm along the longitudinal axis of said wiper arm in response to movement of said stroking shaft, (c) a stroking swivelling lever attached to said stroking shaft for pivotal movement of said stroking shaft with said stroking swivelling lever, (d) a coupler connected at a first end to said stroking swivelling lever (e) an intermediate lever mounted for swivellable movement between first and second reversing positions, and having a first end attached to a second end of said coupler and a portion between its swivel point and said first end of said intermediate lever which is congruent with the longitudinal axis of said coupler, and drive means coupled to a second end of said intermediate lever and to aid wiper arm shaft for imparting reciprocating movement to said wiper arm shaft between first and second reversing positions and including;

(a) a wiper arm shaft swivelling lever fixed to and pivotal with said wiper arm shaft and mounted for swivellable movement in the same direction as said intermediate lever, and (b) a drive rod connected between said intermediate lever and said wiper arm shaft swivelling lever said coupler passing through a dead center position while said intermediate lever moves between said first and said second reversing positions of said intermediate lever at which dead center position longitudinal movement of said second section of said wiper arm is reversed.

7. A windshield wiper system comprising:

a wiper arm shaft;

a wiper arm having a first section by which said wiper arm is mounted on said wiper arm shaft for pendulum-motion of said wiper arm as said wiper arm shaft undergoes reciprocating movement nd a second section movable relative to said first section of said wiper arm along the longitudinal axis of said wiper arm;

a wiper blade attached to said second section of said wiper arm;

mounting means for attaching said second section of said wiper arm to said first section of said wiper arm for pendulum-motion of said wiper blade with said wiper arm and movement of said wiper blade with said second section of said wiper arm along the longitudinal axis of said wiper arm during pendulum-motion of said wiper arm, said mounting means including:

(a) a stroking shaft coaxial with said wiper arm shaft, (b) means connected between said second section of said wiper and said stroking shaft for imparting movement to said second section of said wiper arm along the longitudinal axis of said wiper arm in response to movement of aid stroking shaft, (c) a stroking swivelling lever attached to said stroking shaft for pivotal movement of said stroking shaft with said stroking swivelling lever, (d) a coupler connected at a first en to said stroking swivelling lever, (e) an intermediate lever mounted for swivellable movement between first and second reversing positions and having a first end attached to a second end of said coupler and potion between its swivel point and said first end of said id intermediate lever which is congruent with the longitudinal axis of said coupler, and drive means, coupled to a second end of said intermediate lever and to said wiper arm shaft for impacting reciprocating movement to said wiper arm shaft between first and second reversing positions, said drive means including a drive motor, a crank at the output of said drive motor, a drive rod connected between said crank and said intermediate lever and a wiper arm shaft swivelling lever fixed to and pivotal with said wiper arm shaft and swivellable in the same direction as said intermediate lever, said coupler passing through a dead center position while said intermediate lever moves between said first and said second reversing portions of said intermediate lever at which dead center position longitudinal movement of said second section of said wiper arm is reversed.

* * * * *